(12) United States Patent
Hoshino

(10) Patent No.: US 10,759,065 B2
(45) Date of Patent: Sep. 1, 2020

(54) MACHINE TOOL

(71) Applicant: FANUC CORPORATION, Yamanashi (JP)

(72) Inventor: Yoshinori Hoshino, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 185 days.

(21) Appl. No.: 15/726,532

(22) Filed: Oct. 6, 2017

(65) Prior Publication Data
US 2018/0099419 A1   Apr. 12, 2018

(30) Foreign Application Priority Data

Oct. 11, 2016 (JP) .................................. 2016-200415

(51) Int. Cl.
| B25J 19/00 | (2006.01) |
|---|---|
| B25J 15/00 | (2006.01) |
| B23Q 11/00 | (2006.01) |
| B23Q 11/08 | (2006.01) |
| B25J 21/00 | (2006.01) |

(52) U.S. Cl.
CPC ....... B25J 19/0075 (2013.01); B23Q 11/0064 (2013.01); B23Q 11/0891 (2013.01); B25J 15/00 (2013.01); B25J 21/00 (2013.01)

(58) Field of Classification Search
CPC ....... B25J 19/0075; B25J 21/00; Y10S 901/49
See application file for complete search history.

(56) References Cited

U.S. PATENT DOCUMENTS

| 3,204,492 A | 9/1965 | Spreen | |
|---|---|---|---|
| 4,093,491 A * | 6/1978 | Whelpton | B29C 65/18 156/293 |
| 5,306,999 A * | 4/1994 | Hoffman | B60L 53/305 320/109 |
| 6,210,086 B1 | 4/2001 | Lecornet et al. | |

(Continued)

FOREIGN PATENT DOCUMENTS

| CN | 203266941 U | 11/2013 |
|---|---|---|
| CN | 204339410 U | 5/2015 |

(Continued)

OTHER PUBLICATIONS

English Abstract and Machine Translation for Japanese Publication No. 08-066865 A, published Mar. 12, 1996, 25 pgs.

(Continued)

*Primary Examiner* — Michael S Lowe
(74) *Attorney, Agent, or Firm* — Fredrikson & Byron, P.A.

(57) ABSTRACT

A machine tool includes: an exterior cover covering a machining area where a workpiece on a worktable is machined by a machining tool; an articulated robot arranged inside the exterior cover and configured to replace the workpiece; a controller configured to control the posture of the articulated robot and the coordinate point at which a hand of the articulated robot is positioned; and a protective cover arranged inside the exterior cover and configured to protect at least the hand from scattered matter arising due to machining of the workpiece when the articulated robot is set at a predetermined posture or when the hand is moved to a predetermined coordinate point.

3 Claims, 12 Drawing Sheets

(56) References Cited

U.S. PATENT DOCUMENTS

| | | | |
|---|---|---|---|
| 6,623,011 | B1 | 9/2003 | Ueda et al. |
| 10,137,580 | B1* | 11/2018 | Cobb .................. B25J 19/06 |
| 10,265,870 | B2* | 4/2019 | Ebihara ............. B25J 19/0075 |
| 2018/0126567 | A1* | 5/2018 | Morimura ................ B08B 3/02 |

FOREIGN PATENT DOCUMENTS

| | | |
|---|---|---|
| DE | 102016123597 A1 | 6/2017 |
| JP | 6274944 U | 5/1987 |
| JP | 63105858 A | 5/1988 |
| JP | 171045 U | 5/1989 |
| JP | 6301142 A | 11/1993 |
| JP | 636742 U | 5/1994 |
| JP | 7601 U | 1/1995 |
| JP | 7136892 A | 5/1995 |
| JP | 866865 A | 3/1996 |
| JP | 8174371 A | 7/1996 |
| JP | 10277871 A | 10/1998 |
| JP | 200162669 A | 3/2001 |
| JP | 200368697 A | 3/2003 |
| JP | 200389031 A | 3/2003 |
| JP | 200498247 A | 4/2004 |
| JP | 2006975 A | 1/2006 |
| JP | 2008246585 A | 10/2008 |
| JP | 2009212335 A | 9/2009 |
| JP | 2011041922 A | 3/2011 |
| JP | 2013121466 A | 6/2013 |
| JP | 201674062 A | 5/2016 |
| JP | 2016135522 A | 7/2016 |
| JP | 2016215346 A | 12/2016 |
| JP | 201820402 A | 2/2018 |
| SU | 1496987 A1 | 7/1989 |
| WO | 2009071073 A1 | 6/2009 |
| WO | 2013099091 A1 | 7/2013 |
| WO | 2014179358 A9 | 1/2015 |
| WO | 2015124645 A1 | 8/2015 |

OTHER PUBLICATIONS

English Abstract and Machine Translation for Japanese Publication No. 2009-212335 A, published Sep. 17, 2009, 11 pgs.

English Abstract and Machine Translation for Japanese Publication No. 2003-068697 A, published Mar. 7, 2003, 12 pgs.

English Abstract and Machine Translation for Japanese Publication No. 2001-062669 A, published Mar. 13, 2001, 10 pgs.

English Abstract and Machine Translation for Japanese Publication No. 2003-089031 A, published Mar. 25, 2003, 13 pgs.

English Machine Translation for Japanese Publication No. 01-071045 U, published May 11, 1989, 3 pgs.

English Abstract and Machine Translation for Japanese Publication No. 2016-135522 A, published Jul. 28, 2016, 13 pgs.

English Abstract and Machine Translation for Japanese Publication No. 2008-246585 A, published Oct. 16, 2008, 15 pgs.

English Abstract and Machine Translation for Japanese Publication No. JPH0636742 U, published May 17, 1994, 8 pgs.

English Abstract and Machine Translation for Japanese Publication No. 2016-074062 A, published May 12, 2016, 11 pgs.

English Abstract and Machine Translation for Japanese Publication No. 07-136892 A, published May 30, 1995, 8 pgs.

English Abstract and Machine Translation for Japanese Publication No. 2004-098247 A, published Apr. 2, 2004, 7 pgs.

English Abstract and Machine Translation for International Publication No. WO2013099091 A1, published Jul. 4, 2013, 19 pgs.

English Abstract and Machine Translation for Japanese Publication No. 10-277871 A, published Oct. 20, 1998, 12 pgs.

English Machine Translation for Japanese Publication No. JPH07601 U, published Jan. 6, 1995, 8 pgs.

English Abstract and Machine Translation for Japanese Publication No. 08-174371 A, published Jul. 9, 1996, 8 pgs.

Untranslated Decision to Grant a Patent mailed by Japan Patent Office (JPO) for Application No. 2016-200415, dated Apr. 2, 2019, 3 pgs.

English Machine Translation of Decision to Grant a Patent mailed by Japan Patent Office (JPO) for Application No. 2016-200415, dated Apr. 2, 2019, 2 pgs.

Untranslated Notice of Reasons for Refusal mailed by Japan Patent Office (JPO) for Application No. 2016-200415, dated Sep. 25, 2018, 6 pgs.

English Machine Translation of Notice of Reasons for Refusal mailed by Japan Patent Office (JPO) for Application No. 2016-200415, dated Sep. 25, 2018, 6 pgs.

English Abstract and Machine Translation for Chinese Publication No. 203266941 U, published Nov. 6, 2013, 5 pgs.

English Abstract and Machine Translation for Chinese Publication No. 204339410 U, published May 20, 2015, 9 pgs.

Partial English Machine Translation of Soviet Union Publication No. 1496987 A1, published Jul. 30, 1989, 3 pgs.

English Abstract and Machine Translation for Japanese Publication No. 2013-121466 A, published Jun. 20, 2013, 10 pgs.

U.S. Appl. No. 15/726,561, Non-Final Office Action dated Feb. 5, 2019, 13 pgs.

English Abstract for Japanese Publication No. 05-301142 A, published Nov. 16, 1993, 8 pgs.

English Abstract and Machine Translation for Japanese Publication No. 2016-215346 A, published Dec. 22, 2016, 12 pgs.

English Abstract and Machine Translation for Japanese Publication No. 63-105858 A, published May 11, 1988, 7 pgs.

English Abstract and Machine Translation for Japanese Publication No. 2006-000975 A, published Jan. 5, 2006, 9 pgs.

English Machine Translation for Japanese Publication No. 62-074944 U, published May 13, 1987, 3 pgs.

English Abstract and Machine Translation for Japanese Publication No. 2018-020402 A, published Feb. 8, 2018, 11 pgs.

English Abstract and Machine Translation of International Application Publication No. 2015124645 A1, published Aug. 27, 2015, 17 pgs.

English Abstract and Machine Translation of International Application Publication No. 2009071073 A1, published Jun. 11, 2009, 11 pgs.

English Machine Translation for German Publication No. 102016123597 A1, published Jun. 14, 2017, 30 pages.

English Abstract and Machine Translation for Japanese Publication No. 2011-041922 A, published Mar. 3, 2011, 5 pages.

* cited by examiner

MACHINE TOOL

CROSS-REFERENCE TO RELATED APPLICATION

This application is based upon and claims the benefit of priority from Japanese Patent Application No. 2016-200415 filed on Oct. 11, 2016, the contents of which are incorporated herein by reference.

BACKGROUND OF THE INVENTION

Field of the Invention

The present invention relates to a machine tool for machining a workpiece.

Description of the Related Art

Japanese Laid-Open Patent Publication No. 05-301142 discloses a machine tool having a transfer device for moving a workpiece from a workpiece magazine to a mounting jig.

SUMMARY OF THE INVENTION

According to the technique of Japanese Laid-Open Patent Publication No. 05-301142, since the machine tool includes an automatic transfer machine (transfer device), scatters such as chips, cutting fluid, etc. resulting from workpiece machining may adhere to the automatic transfer machine. When the hand (gripper) of the automatic transfer machine with scatters attached thereto tries to hold a workpiece, there is a risk that the workpiece slips and the hand fails to grip the workpiece correctly.

The present invention has been devised to solve the above problem, it is therefore an object of the present invention to provide a machine tool capable of suppressing attachment of scattered matters to at least a hand of an automatic transfer machine.

According to the present invention, a machine tool includes: an exterior cover covering a machining area where a workpiece on a worktable is machined by a machining tool; an automatic transfer machine arranged inside the exterior cover and configured to replace the workpiece; a controller configured to control a posture of the automatic transfer machine and a coordinate point at which a hand of the automatic transfer machine is positioned; and a protector arranged inside the exterior cover and configured to protect at least the hand from scattered matter arising due to machining of the workpiece when the automatic transfer machine is set at a predetermined posture or when the hand is moved to a predetermined coordinate point. This configuration can suppress adherence of scattered matter to the hand, thus enabling the hand to grip the workpiece reliably.

In the above configuration, the protector may be a protective cover configured to cover at least the hand. With this, it is possible to suppress adherence of scattered matter to the hand by the simple structure.

In the above configuration, a retraction area into which the automatic transfer machine is retracted during the machining of the workpiece may be provided inside the exterior cover, and the protective cover may be arranged in the retraction area. Since in this configuration the protective cover is installed in the retraction area that is away from the machining area where many chips and particles are scattered, it is possible to suppress adherence of scattered matter to the hand in a more reliable manner.

Further, the protective cover may be a movable cover provided on the automatic transfer machine and configured to open when the hand grips the workpiece and close so as to cover the hand when the workpiece is being machined. This configuration makes it possible to protect the hand from scattered matter without moving the hand to a particular position.

The automatic transfer machine may be an articulated robot and the arm of the articulated robot can function as the protector. This configuration makes it possible to integrate, in the articulated robot, the protector for protecting the hand from scattered matter and the hand to be protected. Accordingly, it is not necessary to provide a protector in a separate place inside the exterior cover, and it is hence possible to achieve space-saving inside the exterior cover.

In the above configuration, a retraction area into which the automatic transfer machine is retracted during the machining of the workpiece may be provided inside the exterior cover, the controller may be configured to position at least the hand to the retraction area while the workpiece is being machined and, the protector may be configured to shut off the machining area and the retraction area from each other while the workpiece is being machined. This configuration can suppress entry of scattered matter into the retraction area, and it is hence possible to suppress adherence of scattered matter to the hand.

The protector may be a movable wall configured to shut off and open a boundary between the machining area and the retraction area. In this configuration, when the machining area and the retraction area are shut off from each other by the movable wall, the hand can be protected from scattered matter. When the movable wall is opened so as not to shut off the machining area from the retraction area, the automatic transfer machine can move the hand to the machining area so that the hand can perform work in the machining area.

Further, the protector may be a fluid flow generator configured to eject or suction a fluid to thereby shut off the machining area and the retraction area from each other. This configuration enables the automatic transfer machine to move the hand between the machining area and the retraction area even when the machining area and the retraction area are shut off from each other.

Furthermore, the protector may be an electromagnetic field generator unit configured to shut off the machining area and the retraction area from each other by generating an electric or magnetic field. This configuration also enables the automatic transfer machine to move the hand between the machining area and the retraction area even when the machining area and the retraction area are shut off from each other.

The protective cover may have a wiper configured to remove the scattered matter attached at least to the hand. This configuration makes it possible to remove the scattered matter from the hand when the hand is inserted into the protective cover, and it is possible to prevent scattered matter from adhering to the hand.

Also, the movable wall may have a wiper configured to remove the scattered matter attached at least to the hand. This configuration makes it possible to remove the scattered matter attached to the hand when the hand moves from the machining area to the retraction area. It is hence possible to suppress attachment of scattered matter to the hand.

The fluid flow generator may be configured to remove the scattered matter attached to the hand by the fluid when the hand moves between the machining area and the retraction area. In this configuration, it is possible to shut off the machining area and the retraction area from each other and protect the hand from the scattered matter by the flow of the fluid generated by the fluid flow generator. Further, it is possible to remove the scattered matter attached to the hand. As a result, it is possible to suppress adherence of scattered matter to the hand.

Further, the electromagnetic field generator unit may be configured to remove the scattered matter attached to the hand by the electric or magnetic field when the hand moves between the machining area and the retraction area. In this configuration, it is possible to shut off the machining area and the retraction area from each other and protect the hand from the scattered matter by an electric field or magnetic field generated by the electromagnetic field generator unit. Further, it is possible to remove the scattered matter attached to the hand. As a result, it is possible to suppress adherence of scattered matter to the hand.

According to the present invention, it is possible to prevent adherence of scattered matter at least to the hand of the automatic transfer machine.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A machine tool according to the present invention will be detailed hereinbelow by describing preferred embodiments with reference to the accompanying drawings.

First Embodiment

Overall Structure of Machine Tool

Figure 1:
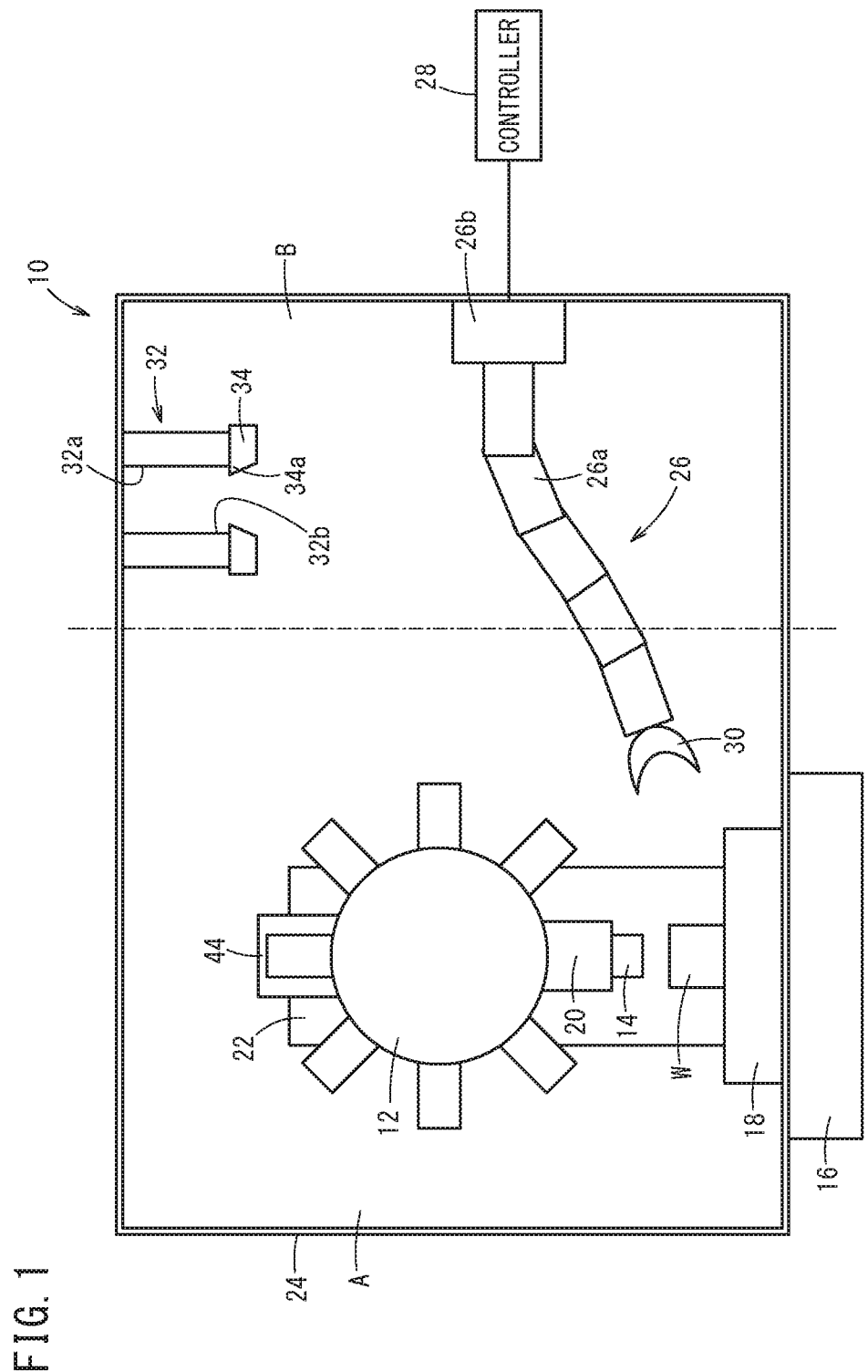
FIG. 1 is a schematic configuration diagram of a machine tool according to a first embodiment.
Figure 2:
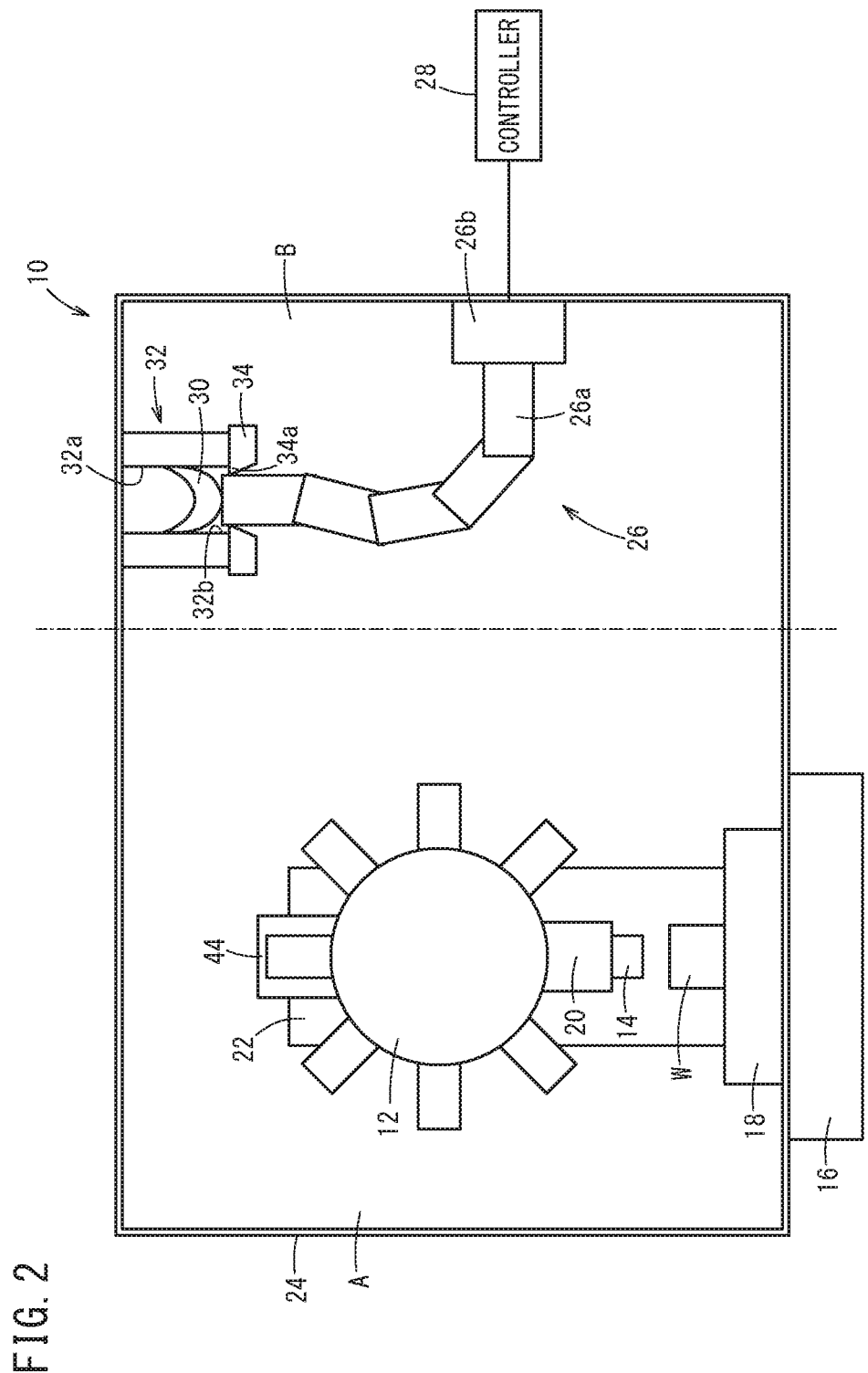
FIG. 2 is a schematic configuration diagram of the machine tool of the first embodiment.

FIGS. 1 and 2 are schematic configuration diagrams of a machine tool 10. FIG. 1 shows a state in which a workpiece W is not processed by the machine tool 10. FIG. 2 shows a state in which the workpiece W is being machined by the machine tool 10. The machine tool 10 of the first embodiment is a machining center having an automatic tool changer 12. In the machine tool 10, a plurality of machining tools 14 are automatically changed by the automatic tool changer 12 so as to perform multiple cutting processes on the workpiece W. The machine tool 10 includes the automatic tool changer 12, a bed 16, a worktable 18, a spindle head 20, a column 22, an exterior cover 24, an articulated robot (automatic transfer machine) 26, and a controller 28.

The worktable 18 is set on the upper surface of the bed 16. The worktable 18 is arranged so as to be movable relative to the bed 16 in the horizontal direction, and is moved to an arbitrary position by a ball screw mechanism and a servomotor (not shown). The workpiece W is fixed on the top surface of the worktable 18.

The spindle head 20 as well as the automatic tool changer 12 is supported by the column 22 so as to be movable in the vertical direction. A ball screw mechanism (not shown) is provided at the connecting portion between the spindle head 20 and the column 22. The spindle head 20 and the automatic tool changer 12 integrally move as the servomotor 44 drives the ball screw mechanism.

A machining tool 14 is attached to a spindle (not shown) of the spindle head 20. The machining tool 14 attached to the spindle is automatically changed by the automatic tool changer 12 in accordance with the machining steps. As the spindle rotates, the machining tool 14 cuts the workpiece W. By controlling the horizontal movement of the worktable 18 and the vertical movement of the spindle head 20, the workpiece W can be cut into an arbitrary shape.

The automatic tool changer 12, the worktable 18, the spindle head 20 and the column 22 are covered by an exterior cover 24. The exterior cover 24 is provided to prevent chips, cutting fluid, etc. (hereinafter referred to as "scattered matter") generated by the machining tool 14 that machines the workpiece W, from scattering outside the exterior cover 24. Further, the exterior cover 24 prevents contact between the operator and the rotating bodies such as the machining tool 14, during the machining of the workpiece W.

The articulated robot 26 is arranged in the exterior cover 24. The articulated robot 26 replaces the workpieces W on the worktable 18. The articulated robot 26 has an arm 26a and is fixed to the exterior cover 24 via a base 26b. A hand 30 is attached to the distal end of the arm 26a. The hand 30 can grip the workpiece W and the articulated robot 26 can move the workpiece W being held by the hand 30 to an arbitrary position. The articulated robot 26 takes off the workpiece W after machining from the worktable 18 and sets an unmachined workpiece W on the worktable 18. The articulated robot 26 may place the unmachined workpiece W on the worktable 18 by transferring the workpiece W from either the inside or the outside of the exterior cover 24. Further, the articulated robot 26 may put the workpiece W after machining, either in the inside or the outside of the exterior cover 24. The exterior cover 24 has a door (not shown) that can be opened and closed. This door may have a servomotor and the like so as to be opened and closed by a control signal of the controller 28, which will be described later. Alternatively, the door may be opened and closed by the articulated robot 26.

The interior of the exterior cover 24 includes a machining area A, which is an area where the workpiece W is machined by the machining tool 14 and a retraction area B which is an area into which the articulated robot 26 is retracted during machining of the workpiece W. The retraction area B is provided adjacent to the machining area A. The articulated robot 26 is fixed to the side surface of the exterior cover 24 in the retraction area B. When replacing workpieces W, the articulated robot 26 extends the arm 26a from the retraction area B toward the machining area A, and the hand 30 performs operations in the machining area A (see FIG. 1). When the workpiece W is being machined, the articulated robot 26 retracts the arm 26a and the hand 30 to the retraction area B (see FIG. 2).

The controller 28 controls the posture of the arm 26a and the coordinates of the position at which the hand 30 is located. In response to control signals from the controller 28, the arm 26a takes an arbitrary posture and moves the hand 30 to an arbitrary position.

Configuration of Protective Cover

A protective cover (protector) 32 is fixed to an upper surface of the exterior cover 24 in the retraction area B inside the exterior cover 24 (see FIGS. 1 and 2). The protective cover 32 has a storing portion 32a having a hollow space therein, and an opening 32b which establishes communication between the storing portion 32a and the outside. The storing portion 32a is formed so as to be able to accommodate the hand 30 inserted from the opening 32b. The storing portion 32a should, at least, accommodate the hand 30, and also may accommodate part of the arm 26a.

In machining the workpiece W, the controller 28 controls the articulated robot 26 so as to insert the hand 30 into the storing portion 32a of the protective cover 32 (see FIG. 2). At this time, the hand 30 is enveloped with the protective cover 32. Thereby, scattered matter arising during the machining of the workpiece W is prevented from adhering to the hand 30.

A wiper 34 is provided at the opening 32b of the protective cover 32. The wiper 34 contacts the arm 26a and the hand 30, thereby removing the scattered matter attached to the arm 26a and the hand 30. The shape and material of the wiper 34 are not particularly limited as long as the wiper 34 can remove scattered matter. For example, the wiper 34 is made of resin such as rubber. The wiper 34 has a contact portion 34a, which comes in contact with the arm 26a and the hand 30. The contact portion 34a is formed in a flat shape so as to be in close contact with the arm 26a and the hand 30 when the contact portion 34a comes into contact with the arm 26a or the hand 30. Alternatively, the contact portion 34a may be given in the form of a brush.

Figure 3:
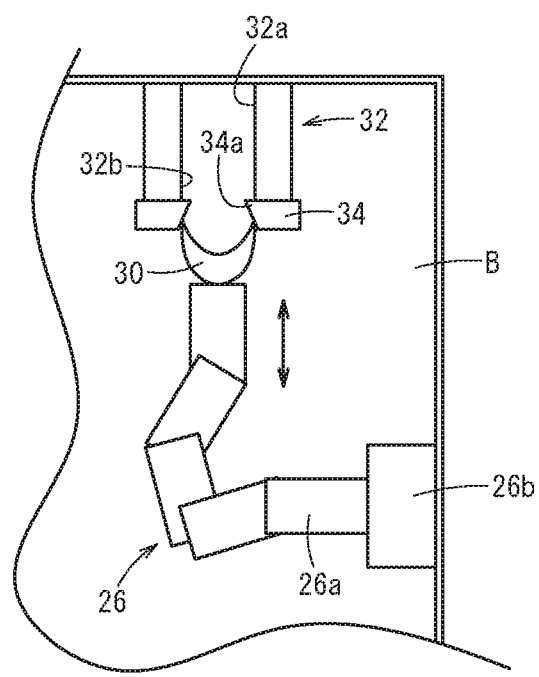
FIG. 3 is a diagram showing an example of a method of removing scattered matter by a wiper according to the first embodiment.
Figure 4:
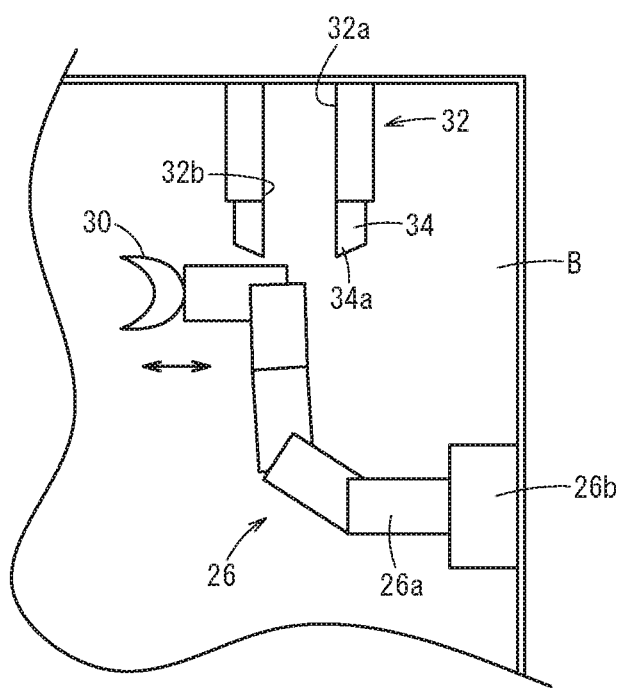
FIG. 4 is a diagram showing an example of a method of removing scattered matter by a wiper according to the first embodiment.

FIGS. 3 and 4 are diagrams showing examples of methods of removing scattered matter by the wiper 34. For example, as shown in FIG. 3, the contact portion 34a of the wiper 34 is provided so as to be directed toward the inner periphery of the opening 32b of the protective cover 32, i.e., face inward. In this case, when the articulated robot 26 brings the hand 30 into and out of the storing portion 32a of the protective cover 32 under the control of the controller 28, the distal ends of the hand 30 and the arm 26a come into contact with the wiper 34 so that scattered matter can be removed. Alternatively, as shown in FIG. 4, the contact portion 34a of the wiper 34 may be provided facing downward. In this case, the controller 28 moves the arm 26a and the hand 30 laterally while abutting the arm 26a and the hand 30 from below against the wiper 34. As a result, the scattered matter adhering to the arm 26a and the hand 30 is removed.

Operation and Effect

In the machine tool 10 of the first embodiment, an articulated robot 26 is provided in the exterior cover 24 having the machining area A for machining workpieces W. Provision of the articulated robot 26 in the exterior cover 24 makes it possible to replace the workpiece W on the worktable 18 speedily as compared with the case where the articulated robot 26 is arranged outside the exterior cover 24, and reduce the installation space of the entire machine tool 10 including the articulated robot 26.

However, in the interior of the exterior cover 24, chips, cutting fluid and other matter are scattered during the machining of the workpiece W, so that the scattered matter may adhere to the arm 26a and the hand 30. When the hand 30 with scatters attached thereto attempts to hold the workpiece W, there is a risk that the workpiece slips and the hand 30 fails to grip the workpiece W reliably. Further, in grasping the workpiece W with the hand 30, there is a risk that the scattered matter attached to the hand 30 may damage the workpiece W. Furthermore, if the arm 26a or the hand 30 is left with scattered matter attached thereto, corrosion of the arm 26a and the hand 30 may be accelerated.

Therefore, in the first embodiment, the protective cover 32 is provided inside the exterior cover 24, and the controller 28 controls the articulated robot 26 so as to insert the hand 30 in the storing portion 32a of the protective cover 32 while the workpiece W is being machined. Owing thereto, during the machining of the workpiece W, it is possible to cover the hand 30 with the protective cover 32 and protect the hand 30 from scattered matter. Thus, this configuration makes it possible to prevent scattered matter from adhering to the hand 30 and enables the hand 30 to grasp the workpiece W in a more reliable manner. It is also possible to prevent the hand 30 from causing damage to the workpiece W when the hand 30 grasps the workpiece W. Furthermore, corrosion of the arm 26a and the hand 30 can be suppressed.

In the first embodiment, the protective cover 32 is arranged in the retraction area B inside the exterior cover 24. Since the protective cover 32 is provided in the retraction area B apart from the machining area A where the workpiece W is machined, it is possible to suppress the entry of scattered matter into the protective cover 32 and inhibit adhesion of scattered matter to the hand 30.

Furthermore, in the first embodiment, the wiper 34 is provided on the protective cover 32. When the articulated robot 26 puts the hand 30 in and out of the protective cover 32 under the control of the controller 28, the wiper 34 touches the hand 30 and can remove the scattered matter from the hand 30.

Second Embodiment

In the second embodiment, a movable wall (protector) 36 shuts off a machining area A and a retraction area B from each other to protect a hand 30 and an arm 26a from scattered matter. Though the second embodiment is described hereinbelow, the same reference numerals will be used for the same components as those in the first embodiment without giving detailed description.

Configuration of Movable Wall

Figure 5:
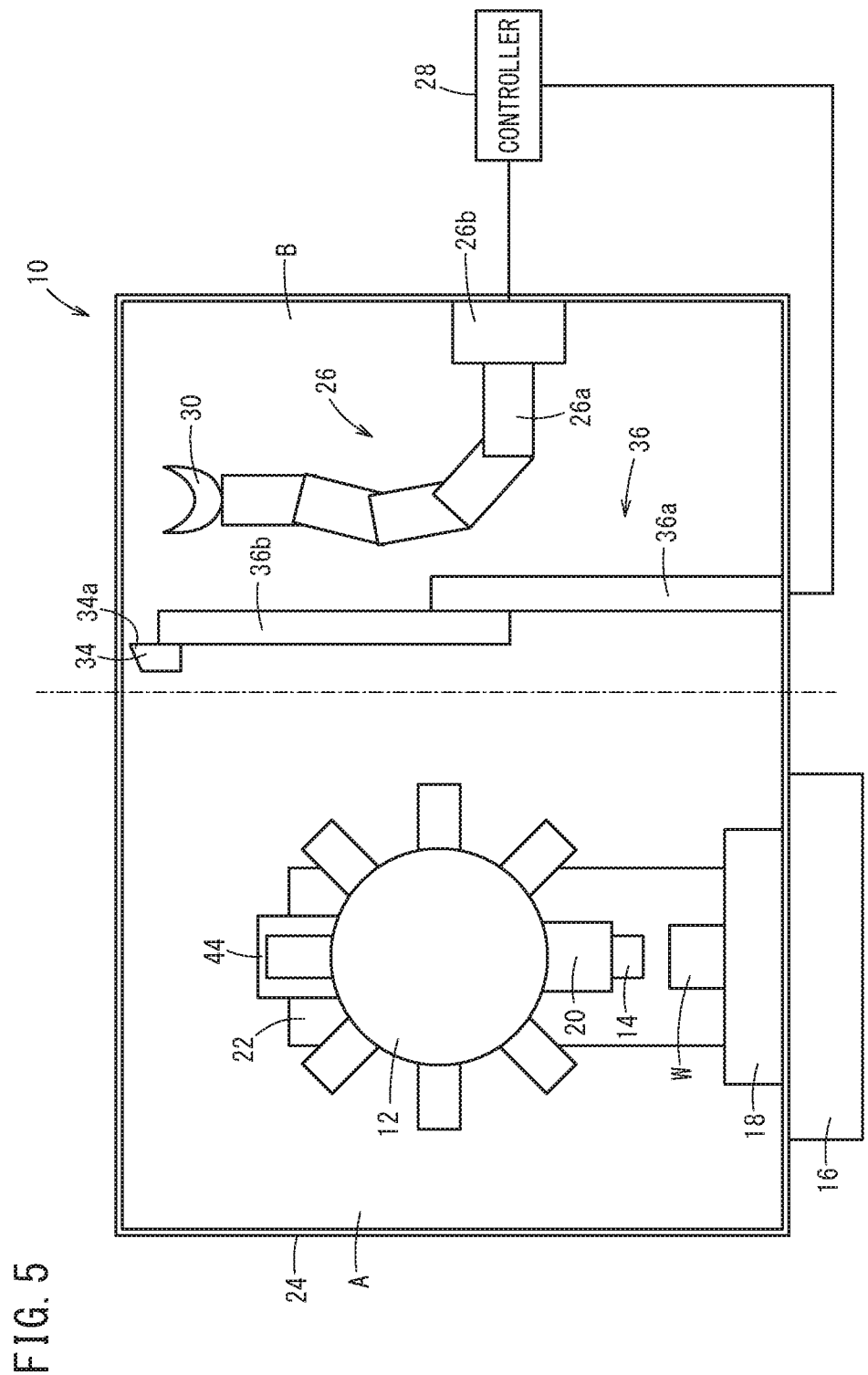
FIG. 5 is a schematic configuration diagram of a machine tool of a second embodiment.

FIG. 5 is a schematic configuration diagram of the machine tool 10. FIG. 5 shows a state where the workpiece W is being machined by the machine tool 10.

The movable wall 36 is installed inside the retraction area B of the exterior cover 24 and closer to the machining area A. The movable wall 36 includes a fixed portion 36a and a movable portion 36b. The fixed portion 36a is fixed to a lower surface of the exterior cover 24 and formed so as to be as high as about half the height of the exterior cover 24. The movable portion 36b is driven by an unillustrated servomotor or the like to be movable in the vertical direction relative to the fixed portion 36a. The vertical movement of the movable portion 36b is controlled by the controller 28.

While the workpiece W is being machined, the controller 28 controls the articulated robot 26 to retract the arm 26a into the retraction area B, and moves the movable portion 36b upward. At this time, the movable wall 36 shuts off the boundary between the retraction area B and the machining area A to thereby protect the arm 26a and the hand 30 from scattered matter. When replacing workpieces W, the controller 28 moves the movable portion 36b downward to open the boundary between the machining area A and the retraction area B, and controls the articulated robot 26 such that the arm 26a extends from the retraction area B to the machining area A and the hand 30 performs work in the machining area A.

A wiper 34 is provided at the upper end of the movable portion 36b. As with the wiper 34 of the first embodiment, the wiper 34 is formed of resin or the like, and makes contact with the arm 26a and the hand 30, thereby removing scattered matter attached to the arm 26a and the hand 30.

Figure 6:
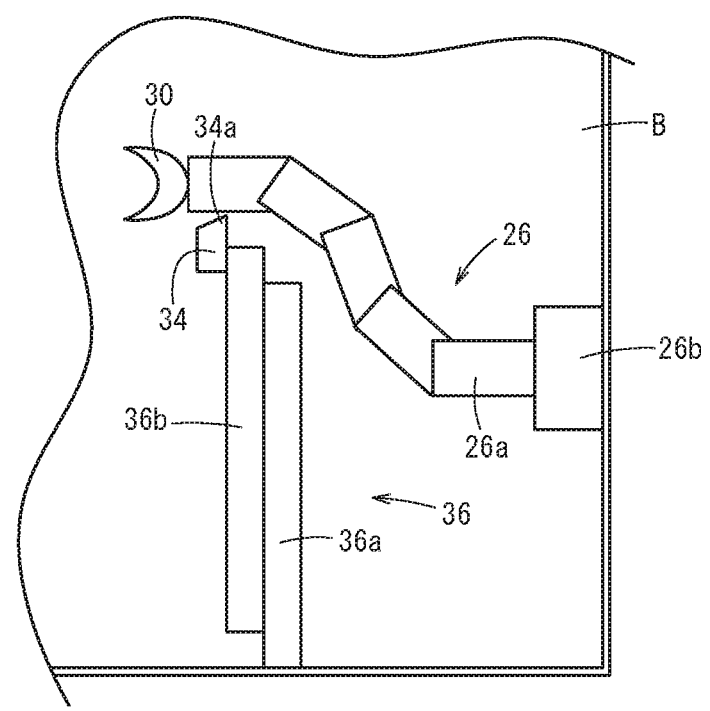
FIG. 6 is a diagram showing an example of a method of removing scattered matter by a wiper according to the second embodiment.

FIG. 6 is a view showing one example of a method of removing scattered matter by the wiper 34. As shown in FIG. 6, a contact portion 34a of the wiper 34 is provided upward from the movable portion 36b of the movable wall 36. The controller 28 moves the movable portion 36b downward and moves the hand 30 and the arm 26a laterally while abutting the arm 26a and the hand 30 from above against the wiper 34. As a result, the scattered matter adhering to the arm 26a and the hand 30 is removed. Removal of the scattered matter by the wiper 34 may be performed not only when the movable portion 36b is at the down position but also when the movable portion 36b is moving upward or downward. In this case, the controller 28 controls the articulated robot 26 so as to move the arm 26a upward or downward in accordance with the movement of the movable portion 36b while moving the arm 26a and the hand 30 laterally with respect to the wiper 34.

Operation and Effect

In the second embodiment, during the machining of the workpiece W, the controller 28 controls the articulated robot 26 to retract the arm 26a into the retraction area B and cause the movable wall 36 to shut off the retraction area B from the machining area A. As a result, it is possible to suppress entry of scattered matter into the retraction area B. Therefore, it is possible to prevent scattered matter from adhering to the arm 26a and the hand 30.

Further, in the second embodiment, the boundary between the machining area A and the retraction area B can be shut off and opened by moving the movable wall 36. When the boundary between the machining area A and the retraction area B is shut off, the arm 26a and the hand 30 are protected from scattered matter, and when the boundary between the machining area A and the retraction area B is opened, the articulated robot 26 extends the arm 26a from the retraction area B to the machining area A side so that the hand 30 can perform work in the machining area A.

Third Embodiment

In the third embodiment, a machining area A and a retraction area B are shut off from each other by air blown from a first air nozzle (protector, fluid flow generator) 38a to protect an arm 26a and a hand 30 from scattered matter. Though the third embodiment is described hereinbelow, the same reference numerals will be used for the same components as those in the first and second embodiments without giving detailed description.

Configuration of Air Pump

Figure 7:
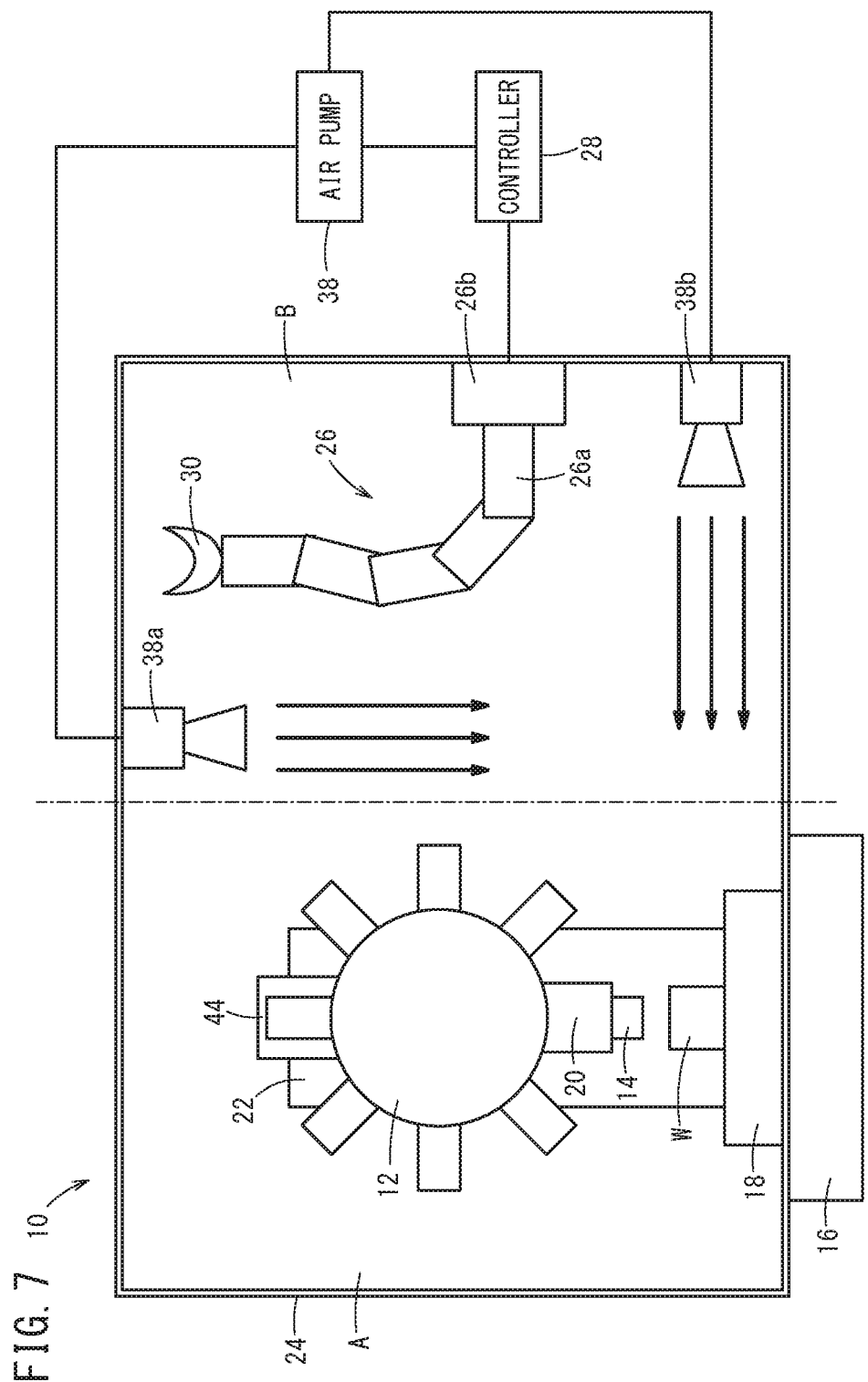
FIG. 7 is a schematic configuration diagram of a machine tool of a third embodiment.

FIG. 7 is a schematic configuration diagram of the machine tool 10. An air pump 38 has a first air nozzle 38a and a second air nozzle 38b. The first air nozzle 38a and the second air nozzle 38b are provided in the exterior cover 24, and the air supplied from the air pump 38 is ejected from the first air nozzle 38a and the second air nozzle 38b. The air pump 38 is controlled by the controller 28. The first air nozzle 38a is arranged at a position closer to the machining area A in the retraction area B of the exterior cover 24. The first air nozzle 38a is fixed to the upper surface of the exterior cover 24, and blows air downward. The second air nozzle 38b is arranged below the articulated robot 26 inside the retraction area B of the exterior cover 24. The second air nozzle 38b is fixed to the side surface of the exterior cover 24 and ejects air toward the machining area A.

As the first air nozzle 38a blows air downward, the machining area A and the retraction area B are shut off from each other by a so-called air curtain. As a result, scattered matter during the machinating of the workpiece W is prevented from entering the retraction area B. In machining the workpiece W, the controller 28 controls the articulated robot 26 so as to retract the arm 26a and the hand 30 into the retraction area B and protect the arm 26a and the hand 30 from scattered matter by the air blown from the first air nozzle 38a.

Also when the arm 26a of the articulated robot 26 extends to the machining area A side, the controller 28 drives the air pump 38 to blow air from the first air nozzle 38a. Even while the first air nozzle 38a is ejecting air, the arm 26a can pass under the first air nozzle 38a. That is, the articulated robot 26 extends the arm 26a from the retraction area B to the machining area A side so that the hand 30 can perform work in the machining area A. Further, when the arm 26a and the hand 30 pass through the boundary between the machining area A and the retraction area B, the arm 26a and the hand 30 pass under the first air nozzle 38a so that the scattered matter adhering to the arm 26a and the hand 30 is blown away by the air ejected from the first air nozzle 38a.

Further, as the controller 28 drives the air pump 38, the second air nozzle 38b blows air toward the machining area A. With this configuration, entry of scattered matter into the retraction area B is suppressed, and the scattered matter that has entered the retraction area B is blown off back to the machining area A side.

Operation and Effect

In the third embodiment, the controller 28 drives the air pump 38 to blow air downward from the first air nozzle 38a arranged on the upper surface of the exterior cover 24 so as to shut off the machining area A and the retraction area B from each other. As a result, it is possible to prevent scattered matter from entering the retraction area B. Therefore, it is possible to prevent scattered matter from adhering to the arm 26a and the hand 30.

In the third embodiment, when the arm 26a and the hand 30 pass through the boundary between the machining area A and the retraction area B, the air blown from the first air nozzle 38a remove the scattered matter from the arm 26a and the hand 30.

Furthermore, in the third embodiment, the controller 28 drives the air pump 38 so that the second air nozzle 38b provided on the side surface of the exterior cover 24 blows air toward the machining area A side. As a result, it is possible to suppress entry of scattered matter into the retraction area B and blow off the scattered matter that has entered the retraction area B back to the machining area A side. Thus, it is possible to prevent scattered matter from adhering to the arm 26a and the hand 30.

Fourth Embodiment

In the fourth embodiment, a machining area A and a retraction area B are shut off by an electric field generated by an electric field generator 42 to thereby protect an arm 26a and a hand 30 from scattered matter. Though the fourth embodiment is described hereinbelow, the same reference numerals will be used for the same components as those in the first to third embodiments without giving detailed description.

Configuration of Electric Field Generator

Figure 8:
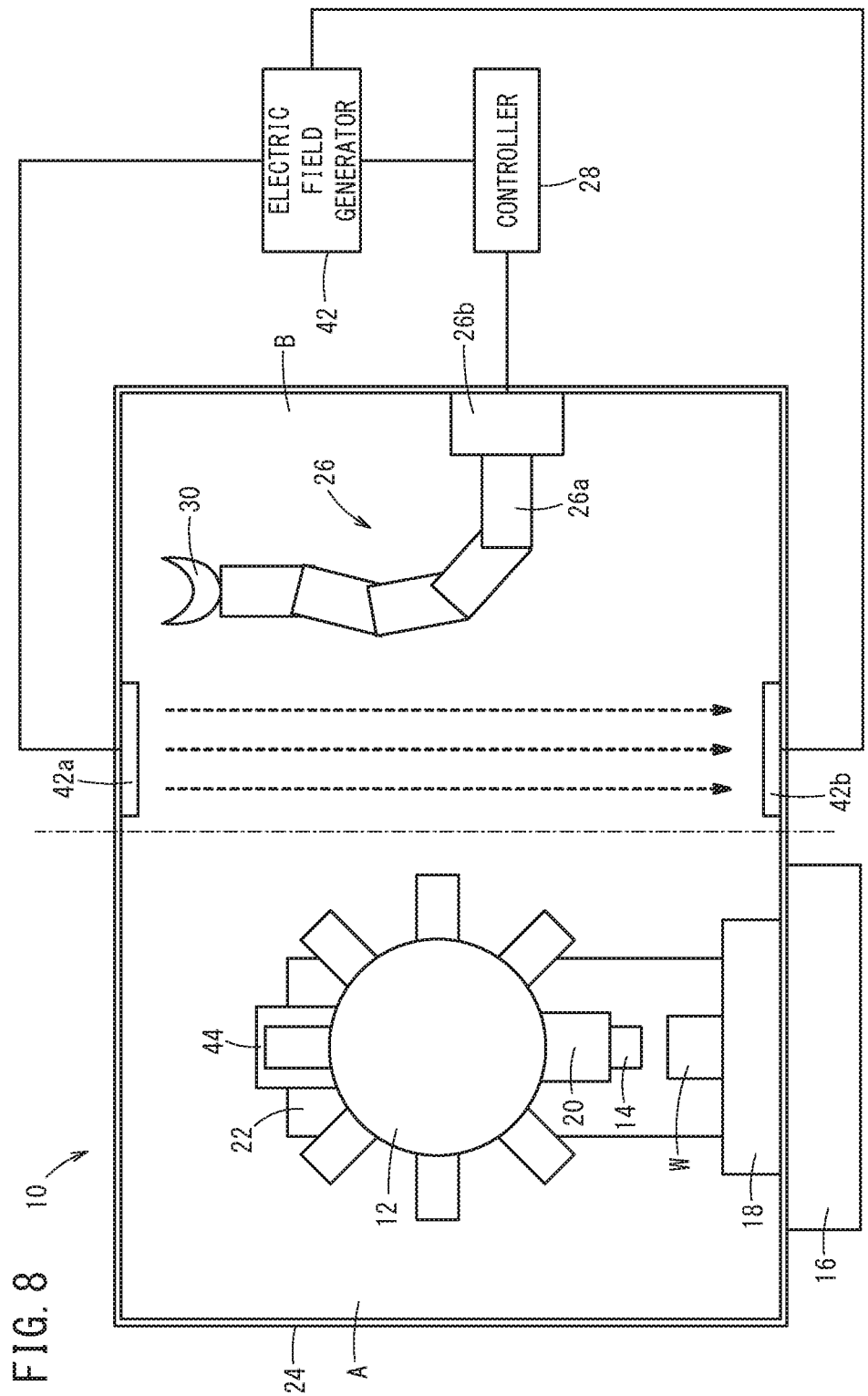
FIG. 8 is a schematic configuration diagram of a machine tool of a fourth embodiment.

FIG. 8 is a schematic configuration diagram of the machine tool 10. The electric field generator 42 has a positive electrode (protector, electromagnetic field generator unit) 42a and a negative electrode (protector, electromagnetic field generator unit) 42b. The electric field generator 42 is composed of a power source, an inverter and the like, and controlled by the controller 28 to generate a voltage difference between the positive electrode 42a and the negative electrode 42b so as to generate an electric field between the positive electrode 42a and the negative electrode 42b. The positive electrode 42a and the negative electrode 42b are arranged close to the machining area A in the retraction area B of the exterior cover 24. The positive electrode 42a is fixed to the upper surface of the exterior cover 24 and the negative electrode 42b is fixed to the lower surface of the exterior cover 24. The positions of the positive electrode 42a and the negative electrode 42b may be reversed.

Since chips scattered in machining the workpiece W are charged with electricity, when the chips pass through a space between the positive electrode 42a and the negative electrode 42b which have the voltage difference, the chips are attracted by the positive electrode 42a or the negative electrode 42b. During the machining of the workpiece W, the controller 28 controls the articulated robot 26 so as to retract the arm 26a to the retraction area B and also causes the electric field generator 42 to generate an electric field so as to shut off the machining area A and the retraction area B from each other, thereby protecting the arm 26a and the hand 30 from scattered cutting chips.

When the articulated robot 26 extends the arm 26a to the machining area A side, the controller 28 continuously drives the electric field generator 42 to generate an electric field between the positive electrode 42a and the negative electrode 42b. Even with the electric field applied between the positive electrode 42a and the negative electrode 42b, the arm 26a can pass through the space between the positive electrode 42a and the negative electrode 42b. That is, the articulated robot 26 moves the arm 26a from the retraction area B to the machining area A side so that the hand 30 can perform work in the machining area A. When passing through the boundary between the machining area A and the retraction area B, the arm 26a and the hand 30 go through the space between the positive electrode 42a and the negative electrode 42b, whereby the scattered matter attached on the arm 26a and the hand 30 is removed by the electric field generated by the electric field generator 42.

Operation and Effect

In the fourth embodiment, an electric field is generated by the electric field generator 42 to thereby shut off the machining area A and the retraction area B from each other. As a result, it is possible to prevent scattered matter from entering the retraction area B. Therefore, it is possible to prevent scattered matter from adhering to the arm 26a and the hand 30.

Further, in the fourth embodiment, when the arm 26a and the hand 30 pass between the machining area A and the retraction area B, the electric field generated by the electric field generator 42 can remove the scattered matter attached on the arm 26a and the hand 30.

Fifth Embodiment

In the fifth embodiment, a machining area A and a retraction area B are shut off from each other by the air blown from a first air nozzle 38a and also by an electric field generated between a positive electrode 42a and a negative electrode 42b so as to protect an arm 26a and a hand 30 from scattered matter. Though the fifth embodiment is described hereinbelow, the same reference numerals will be used for the same components as those in the first to fourth embodiments without giving detailed description.

Configuration of Air Pump and Electric Field Generator

Figure 9:
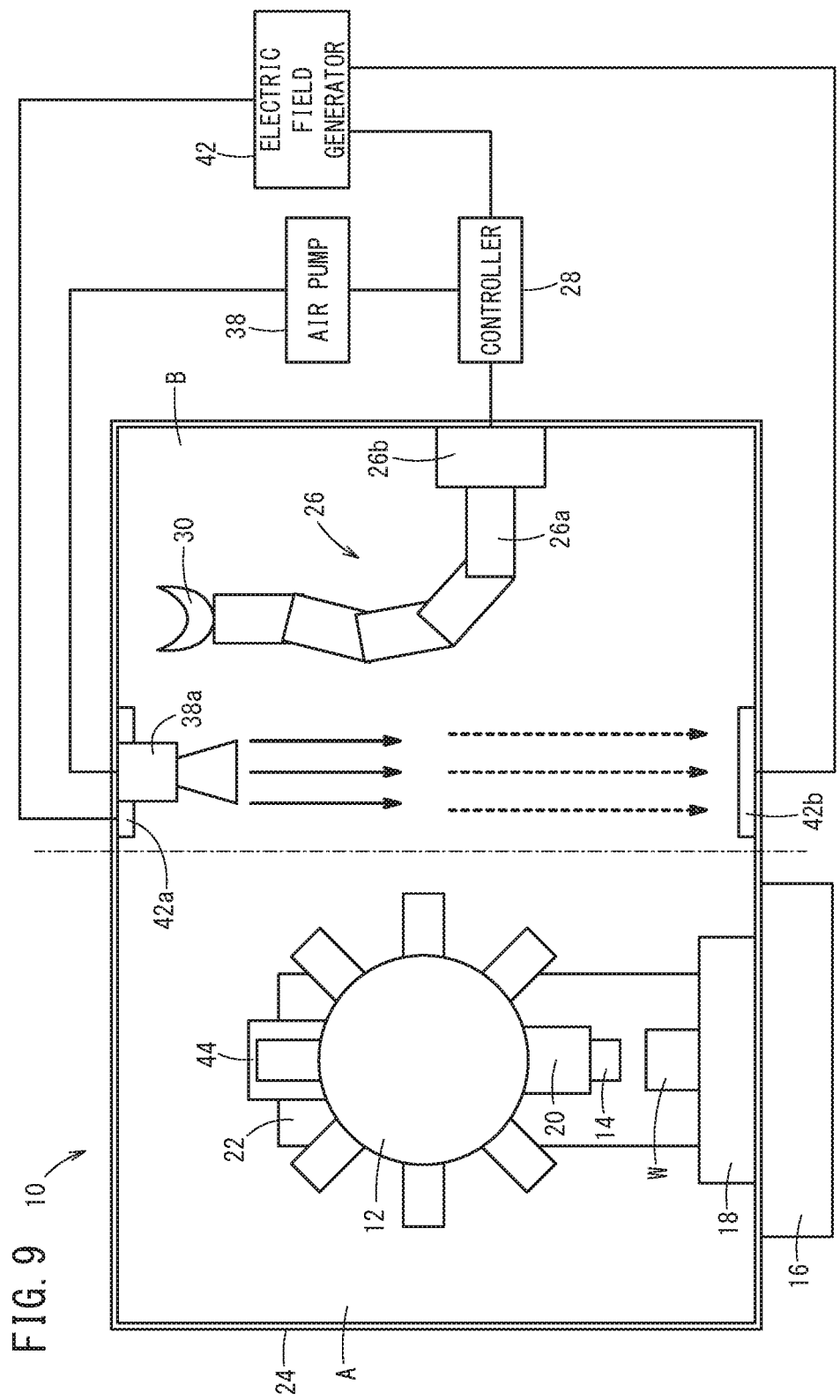
FIG. 9 is a schematic configuration diagram of a machine tool of a fifth embodiment.

FIG. 9 is a schematic configuration diagram of the machine tool 10. The air pump 38 has the first air nozzle 38a. The first air nozzle 38a is provided inside the exterior cover 24, and air supplied from the air pump 38 is ejected from the first air nozzle 38a. The air pump 38 is controlled by the controller 28. The first air nozzle 38a is provided in the retraction area B of the exterior cover 24 at a position close to the machining area A. The first air nozzle 38a is fixed to the upper surface of the exterior cover 24 to blow air downward.

The electric field generator 42 has the positive electrode 42a and the negative electrode 42b. The electric field generator 42 creates a voltage difference between the positive electrode 42a and the negative electrode 42b to generate an electric field between the positive electrode 42a and the negative electrode 42b. The electric field generator 42 is controlled by the controller 28. The positive electrode 42a and the negative electrode 42b are arranged in the retraction area B of the exterior cover 24 at positions close to the machining area A. The positive electrode 42a is fixed to the upper surface of the exterior cover 24 and the negative electrode 42b is fixed to the lower surface of the exterior cover 24. The positions of the positive electrode 42a and the negative electrode 42b may be reversed.

The controller 28 drives the air pump 38 to blow air downward from the first air nozzle 38a provided on the upper surface of the exterior cover 24, thereby shutting off the machining area A and the retraction area B from each other. Further, the controller 28 drives the electric field generator 42 to generate an electric field between the positive electrode 42a and the negative electrode 42b, thereby shutting off the machining area A and the retraction area B from each other.

Operation and Effect

In the fifth embodiment, the first air nozzle 38a provided on the upper surface of the exterior cover 24 blows air downward to thereby shut off the machining area A and the retraction area B from each other while the electric field generator 42 generates an electric field to thereby shut off the machining area A and the retraction area B from each other. As a result, it is possible to prevent scattered matter from entering the retraction area B.

Further, in the fifth embodiment, when the arm 26a and the hand 30 pass through the boundary between the machining area A and the retraction area B, the air blown from the first air nozzle 38a and the electric field generated by the electric field generator 42 can remove scattered matter attached on the arm 26a and the hand 30.

Sixth Embodiment

In the sixth embodiment, a protective cover 32 is provided on a base 26b of an articulated robot 26. Though the sixth embodiment is described hereinbelow, the same reference numerals will be used for the same components as those in the first to fifth embodiments without giving detailed description.

Configuration of Protective Cover

Figure 10:
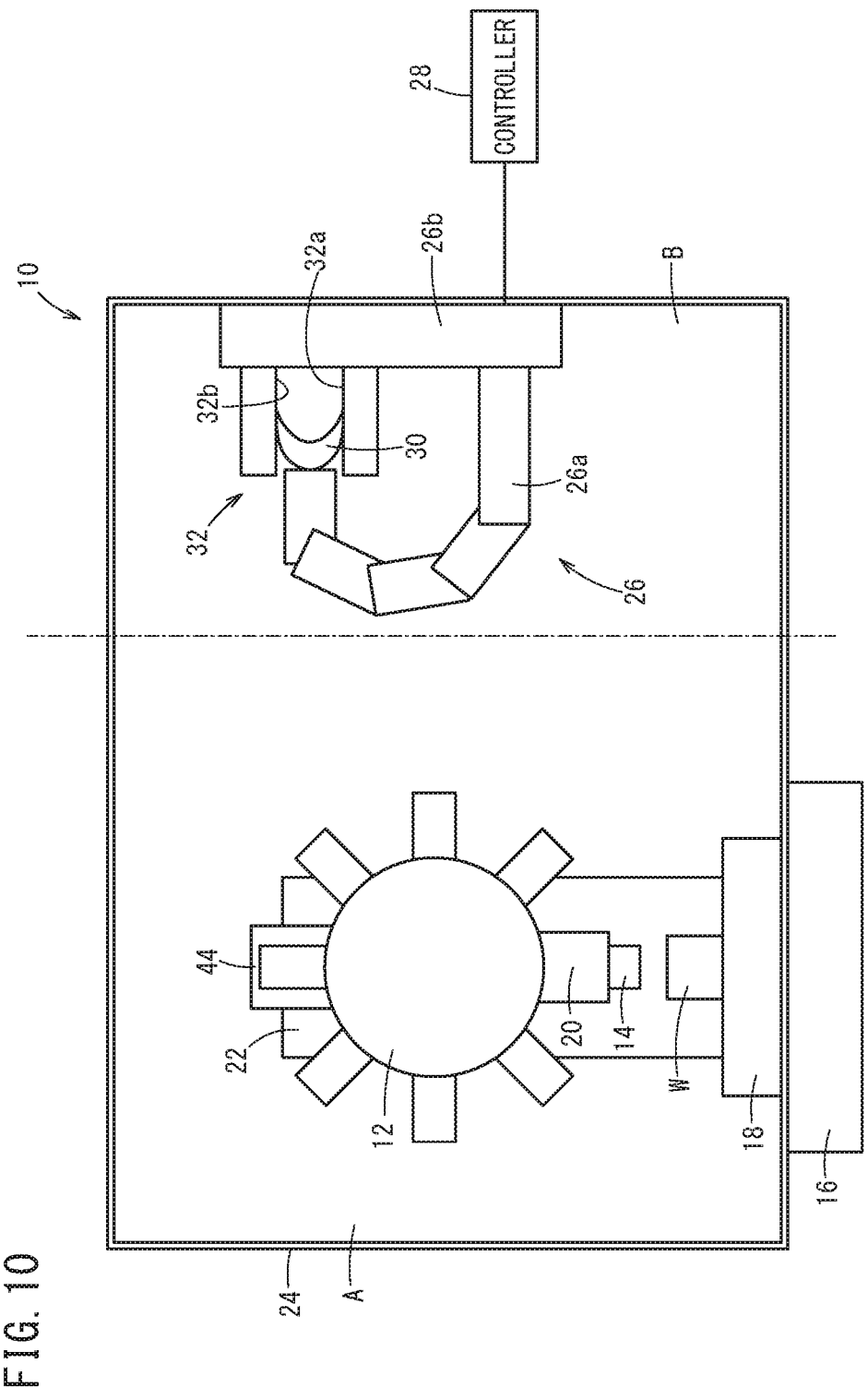
FIG. 10 is a schematic configuration diagram of a machine tool of a sixth embodiment.

FIG. 10 is a schematic configuration diagram of the machine tool 10. The protective cover 32 is fixed to the base 26b of the articulated robot 26. The protective cover 32 of the sixth embodiment has the same configuration as the protective cover 32 of the first embodiment though it is fixed at a position different from that of the first embodiment.

While the workpiece W is being machined, the hand 30 is inserted in the storing portion 32a of the protective cover 32 by the articulated robot 26. At this time, the hand 30 is covered with the protective cover 32. With this configuration, scattered matter arising during the machining of the workpiece W is prevented from adhering to the hand 30. Also in the sixth embodiment, the wiper 34 may be provided in the opening 32b of the protective cover 32 as in the first embodiment.

Operation and Effect

In the sixth embodiment, the protective cover 32 is provided on the base 26b of the articulated robot 26. The protective cover 32 can be installed in the exterior cover 24 at the same time when the articulated robot 26 is installed in the exterior cover 24. Accordingly, the installation work of the protective cover 32 can be made easy.

Seventh Embodiment

In the seventh embodiment, a protective cover 32 is provided at the distal end part of an arm 26a. Though the seventh embodiment is described hereinbelow, the same reference numerals will be used for the same components as those in the first to sixth embodiments without giving detailed description.

Configuration of Protective Cover

Figure 11:
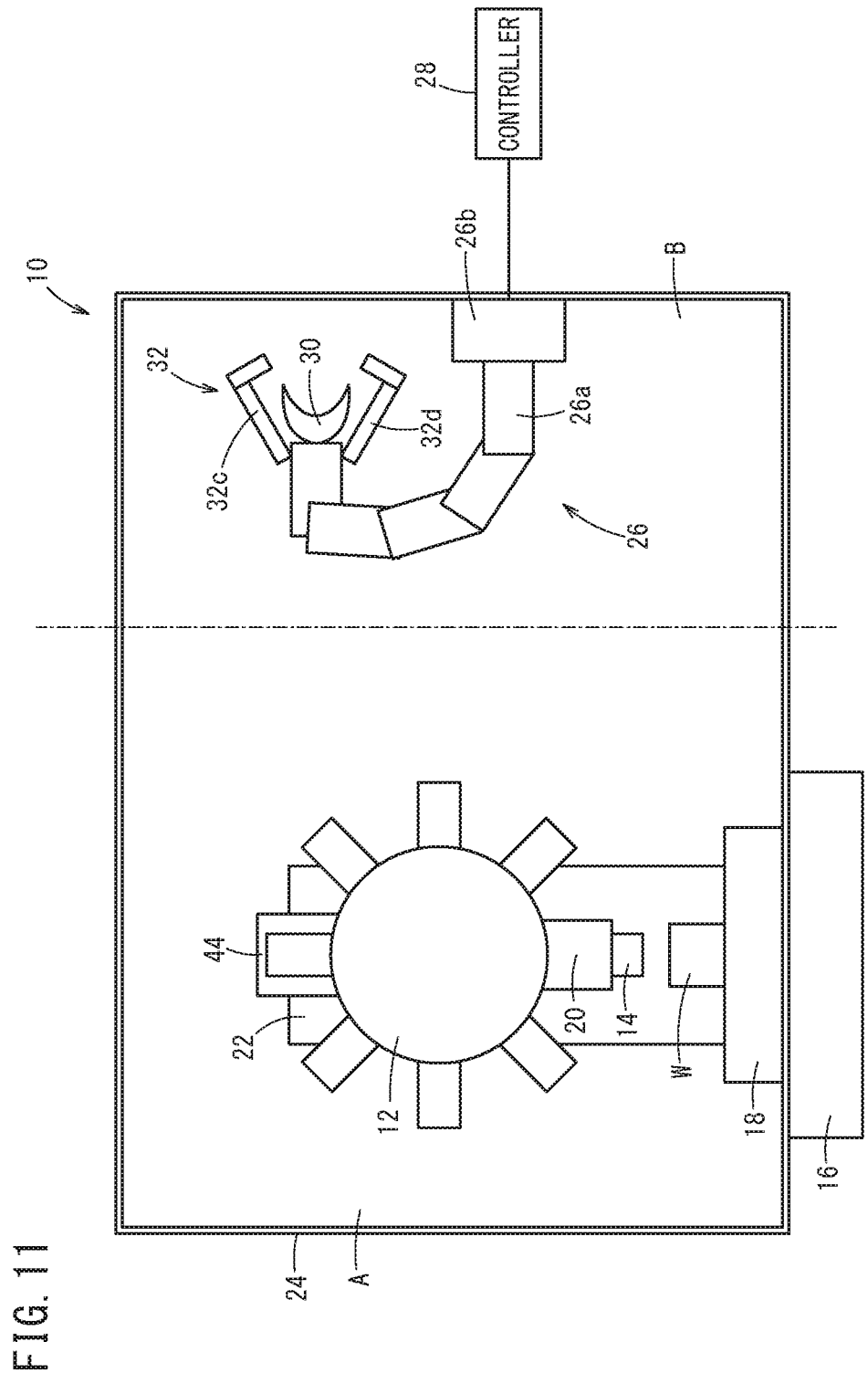
FIG. 11 is a schematic configuration diagram of a machine tool of a seventh embodiment; and, FIG. 12 is a schematic configuration diagram of a machine tool of an eighth embodiment.

FIG. 11 is a schematic configuration diagram of the machine tool 10. The protective cover 32 is provided at the distal end part of the arm 26a, and includes a first member 32c and a second member 32d. The first member 32c and the second member 32d extend from the distal end part of the arm 26a and cover the hand 30, and are each formed so as to be rotated about a pivot at the end on the arm 26a side by an unillustrated actuator or the like. The actuator is controlled by the controller 28. When the first member 32c and the second member 32d are closed, a closed space is formed so as to accommodate the hand 30 therein. With the configuration, the hand 30 is protected from scattered matter. When the first member 32c and the second member 32d are opened, the hand 30 is exposed and becomes able to grip the workpiece W or the like.

Operation and Effect

In the seventh embodiment, the openable/closable protective cover 32 is provided on the distal end part of the arm 26a. Since the protective cover 32 moves together with the distal end part of the arm 26a, it is possible to protect the hand 30 from scattered matter without moving the hand 30 to a specific position.

Eighth Embodiment

In the eighth embodiment, an arm 26a of an articulated robot 26 functions as the protective cover 32. Though the eighth embodiment is described hereinbelow, the same reference numerals will be used for the same components as those in the first to seventh embodiments without giving detailed description.

Configuration of Protective Cover

Figure 12:
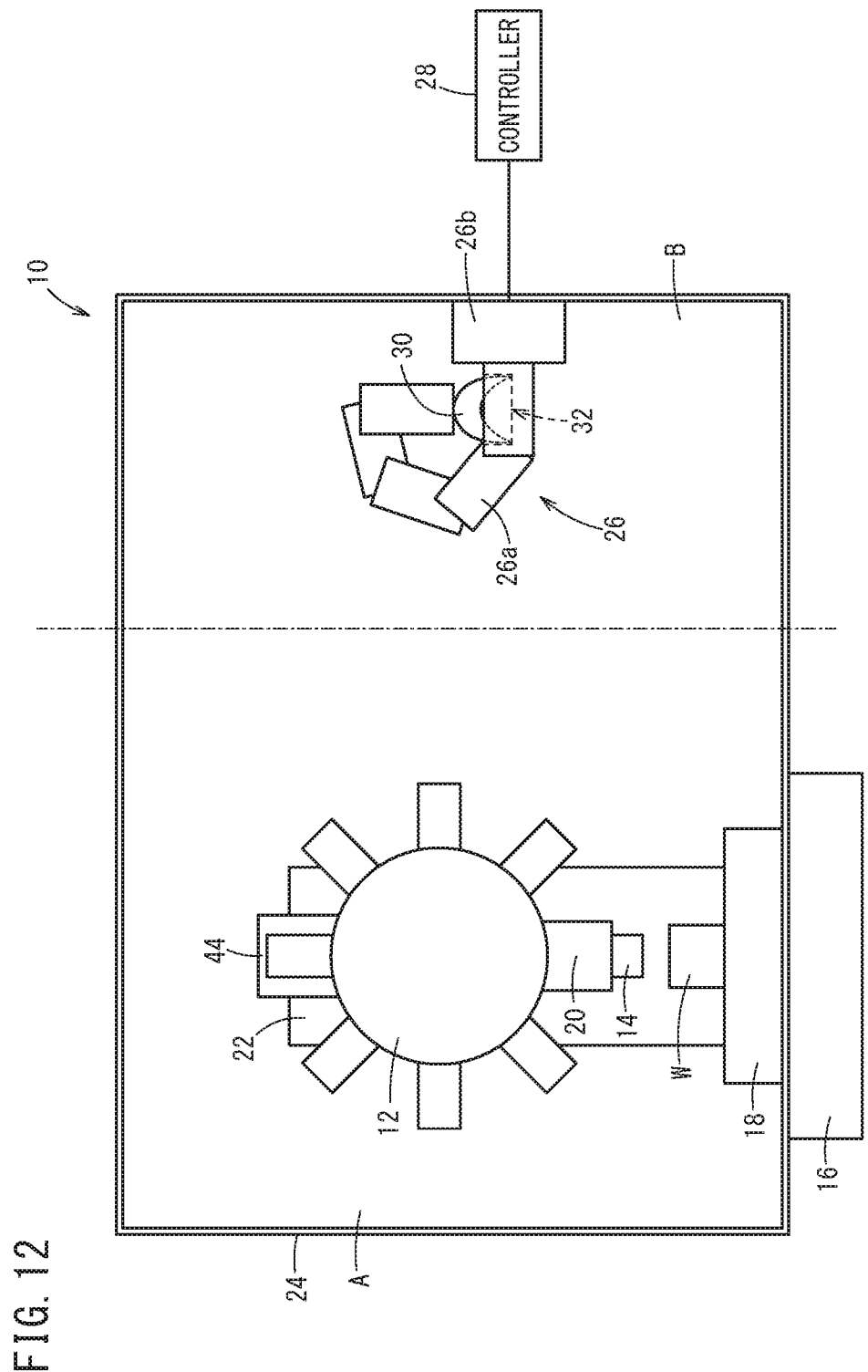

FIG. 12 is a schematic configuration diagram of the machine tool 10. A recess is formed in a portion of the arm 26a that is close to the base 26b, and the portion of the arm 26a with the recess is used as the protective cover 32. While the workpiece W is being machined, the hand 30 is inserted in the storing portion 32a of the protective cover 32 by the articulated robot 26. At this time, the hand 30 is covered with the protective cover 32. With the configuration, adhesion of scattered matter generated during the machining of the workpiece W to the hand 30 is suppressed.

Operation and Effect

In the eighth embodiment, the arm 26a is adapted to function as the protective cover 32. Thereby, no separate protective cover 32 is needed, so that space-saving in the exterior cover 24 can be achieved.

Other Embodiments

Though the present invention has been described based on the first to eighth embodiments, the specific configuration of the invention should not be limited to the first to eighth embodiments. Design changes and others that do not depart from the scope of the invention should also be included in the invention.

In the third and fifth embodiments, the first air nozzle 38a is configured to blow air, but air may be suctioned. The first air nozzle 38a may supply, for example, inert nitrogen or the like instead of air. Instead of the first air nozzle 38a, a liquid may be ejected. That is, any type of fluid may be used as long as it does not accelerate corrosion of the machine tool 10 and does not attach to the hand 30 to thereby affect its gripping of the workpiece W.

Although an electric field is generated by the electric field generator 42 of the fourth and fifth embodiments, a magnetic field may be generated instead. Since the chips scattered upon the machining of the workpiece W are magnetized, they can be attracted by the magnetic field.

In the third to fifth embodiments, the articulated robot 26 retracts both the arm 26a and the hand 30 to the retraction area B during the machining of the workpiece W, but at least the hand 30 should be evacuated to the retraction area B, whereas part of the arm 26a may be located in the machining area A.

In the second to fifth embodiments, each of the movable wall 36, the first air nozzle 38a, the positive and negative electrodes 42a and 42b is arranged in the retraction area B of the exterior cover 24 at a position close to the machining area A. However, the movable wall 36, the first air nozzle 38a, the positive and negative electrodes 42a and 42b may be arranged in the machining area A of the exterior cover 24 at a position close to the retraction area B.

In the eighth embodiment, a recess is formed in a portion of the arm 26a so as to use the portion of the arm 26a having the recess as the protective cover 32. However, instead of forming the recess, the hand 30 may be configured to be inserted between the arm 26a and the exterior cover 24. This configuration enables the arm 26a itself to protect the hand 30 from scattered matter.

What is claimed is:

1. A machine tool comprising:

an exterior cover covering a machining area where a workpiece on a worktable is machined by a machining tool;

an automatic transfer machine arranged inside the exterior cover and configured to replace the workpiece;

a controller configured to control a posture of the automatic transfer machine and a coordinate point at which a hand of the automatic transfer machine is positioned; and, a protector arranged inside the exterior cover and configured to protect at least the hand from scattered matter arising due to machining of the workpiece when the automatic transfer machine is set at a predetermined posture or when the hand is moved to a predetermined coordinate point, wherein the automatic transfer machine is an articulated robot that includes an arm and is fixed to the exterior cover at a proximal end of the arm by a base wherein the hand is attached to a distal end of the arm; and a recess in an arm of the articulated robot functions as the protector wherein the recess is located near the proximal end of the arm.

2. A machine tool comprising:

an exterior cover covering a machining area where a workpiece on a worktable is machined by a machining tool;

an automatic transfer machine arranged inside the exterior cover and configured to replace the workpiece;

a controller configured to control a posture of the automatic transfer machine and a coordinate point at which a hand of the automatic transfer machine is positioned; and, a protector arranged inside the exterior cover and configured to protect at least the hand from scattered matter arising due to machining of the workpiece when the automatic transfer machine is set at a predetermined posture or when the hand is moved to a predetermined coordinate point, wherein the protector is a protective cover configured to cover at least the hand, a retraction area into which the automatic transfer machine is retracted during the machining of the workpiece is provided inside the exterior cover, the protective cover is arranged in the retraction area, the protective cover has a storing portion and an opening which establishes communication between the storing portion and the retraction area and a wiper provided at the opening and configured to remove the scattered matter attached at least to the hand.

3. A machine tool comprising:

an exterior cover covering a machining area where a workpiece on a worktable is machined by a machining tool;

an automatic transfer machine arranged inside the exterior cover and configured to replace the workpiece;

a controller configured to control a posture of the automatic transfer machine and a coordinate point at which a hand of the automatic transfer machine is positioned; and, a protector arranged inside the exterior cover and configured to protect at least the hand from scattered matter arising due to machining of the workpiece when the automatic transfer machine is set at a predetermined posture or when the hand is moved to a predetermined coordinate point, wherein a retraction area into which the automatic transfer machine is retracted during the machining of the workpiece is provided inside the exterior cover, the controller is configured to position at least e hand to the retraction area while the workpiece is being machined, the protector is configured to shut off the machining area and the retraction area from each other while the workpiece is being machined, the protector is a movable wall configured to shut off and open a boundary between the machining area and the retraction area, the movable wall has a wiper configured to remove the scattered matter attached at least to the hand.

* * * * *